(12) United States Patent
Ho et al.

(10) Patent No.: US 8,351,685 B2
(45) Date of Patent: Jan. 8, 2013

(54) DEVICE AND METHOD FOR ESTIMATING DEPTH MAP, AND METHOD FOR GENERATING INTERMEDIATE IMAGE AND METHOD FOR ENCODING MULTI-VIEW VIDEO USING THE SAME

(75) Inventors: Yo Sung Ho, Gwangju (KR); Sang Beom Lee, Gwangju (KR); Kwan Jung Oh, Gwangju (KR)

(73) Assignees: Gwangju Institute of Science and Technology, Gwangju (KR); KT Corporation, Seongnam (KR)

( * ) Notice: Subject to any disclaimer, the term of this patent is extended or adjusted under 35 U.S.C. 154(b) by 1106 days.

(21) Appl. No.: 12/260,986

(22) Filed: Oct. 29, 2008

(65) Prior Publication Data

US 2009/0129667 A1 May 21, 2009

(30) Foreign Application Priority Data

Nov. 16, 2007 (KR) .................. 10-2007-0117404
Jul. 16, 2008 (KR) .................. 10-2008-0069262

(51) Int. Cl.
 *G06K 9/00* (2006.01)
(52) U.S. Cl. .................. 382/154; 345/419; 382/103
(58) Field of Classification Search .................. 345/419, 345/422; 382/154
See application file for complete search history.

(56) References Cited

U.S. PATENT DOCUMENTS

| | | | | |
|---|---|---|---|---|
| 5,963,213 A * | 10/1999 | Guedalia et al. | ............... | 345/427 |
| 6,445,815 B1 * | 9/2002 | Sato | ............... | 382/154 |
| 6,847,728 B2 * | 1/2005 | Tao et al. | ............... | 382/106 |
| 7,085,409 B2 * | 8/2006 | Sawhney et al. | ............... | 382/154 |
| 2002/0110273 A1 * | 8/2002 | Dufour | ............... | 382/154 |
| 2007/0024614 A1 * | 2/2007 | Tam et al. | ............... | 345/419 |
| 2008/0031327 A1 * | 2/2008 | Wang et al. | ............... | 375/240.12 |
| 2008/0080852 A1 * | 4/2008 | Chen et al. | ............... | 396/324 |
| 2009/0129667 A1 * | 5/2009 | Ho et al. | ............... | 382/154 |

* cited by examiner

*Primary Examiner* — Gregory M Desire

(57) ABSTRACT

The present invention relates to a device and a method for estimating a depth map, and a method for making an intermediate image and a method for encoding multi-view video using the same. More particularly, the present invention relates to a device and a method for estimating a depth map that are capable of acquiring a depth map that reduces errors and complexity, and is resistant to external influence by dividing an area into segments on the basis of similarity, acquiring a segment-unit initial depth map by using a three-dimensional warping method and a self adaptation function to which an extended gradient map is reflected, and refining the initial depth map by performing a belief propagation method by the segment unit, and achieving smoother view conversion and improved encoding efficiency by generating an intermediate image with the depth map and utilizing the intermediate image for encoding a multi-view video, and a method for generating the intermediate image and a method for encoding the multi-view video using the same.

12 Claims, 6 Drawing Sheets

DEVICE AND METHOD FOR ESTIMATING DEPTH MAP, AND METHOD FOR GENERATING INTERMEDIATE IMAGE AND METHOD FOR ENCODING MULTI-VIEW VIDEO USING THE SAME

BACKGROUND OF THE INVENTION

1. Technical Field

The present invention relates to a device and a method for estimating a depth map, and a method for generating an intermediate image and a method for encoding multi-view video using the same. More particularly, the present invention relates to a device and a method for estimating a depth map that are capable of acquiring a depth map that reduces errors and complexity, and is resistant to external influence by dividing an area into segments on the basis of similarity, acquiring a segment-unit initial depth map by using a three-dimensional warping method and a self adaptation function to which an extended gradient map is reflected, and refining the initial depth map by performing a belief propagation method by the segment unit, and achieving smoother view switching and improved encoding efficiency by generating an intermediate image with the depth map and utilizing the intermediate image for encoding a multi-view video, and a method for generating an intermediate image and a method for encoding a multi-view video using the same.

2. Related Art

As digital technology becomes more developed and different types of broadcasting media are used by fusing broadcasting with communication, new broadcasting-related additional services using the characteristics of a digital technology are created as a result thereto. A developmental direction of a TV is moving toward high resolution and a large size screen, but a TV screen itself is only two-dimensional. Therefore it is impossible to feel a three-dimensional effect through an existing screen.

A three-dimensional video processing technology, as a core technology of a future IT service field, is the most advanced technology. Competition for development of the three-dimensional video processing technology is keen with the progress to an information industrial society. Such a three-dimensional video processing technology is an essential element for providing a high-quality image service in multimedia application. Currently, the three-dimensional video processing technology has been applied to various fields such as broadcasting, medical service, education, military, a game, virtual reality, etc. in addition to the IT field. Moreover, the three-dimensional video processing technology is also established as a core fundamental technology of future real three-dimensional multimedia commonly required in various fields. Therefore, research on the three-dimensional video processing technology is actively pursued mainly in developed countries.

In general, there are two ways to define a three-dimensional video. First, the three-dimensional video may be defined as a video in which a user senses three-dimensional depth perception, by projecting a part of an image projects from a screen and by applying information on a depth to an image. Second, the three-dimensional video may be defined as a video in which the image becomes realistic to the user by providing the user with multiple views. This three-dimensional video may be classified into a stereoscopic type, a multi-view type, an IP (Integral Photography), multiple views (omni and panorama), hologram, etc. according to an acquisition method, a depth impression, a display type, etc. A method of representing the three-dimensional video generally includes an image-based representation and a mesh-based representation.

Recently, as the method of representing the three-dimensional video, a depth image-based rendering (DIBR) comes into the spotlight. The depth image-based rendering represents a method of creating scenes in different views by using reference images having information such as depth or angle differences for each corresponding pixel. The depth image-based rendering can easily render the shape of a three-dimensional model which is difficult and complex to represent and enables application of a signal processing method such as general image filtering to generate a high-quality three-dimensional video. The depth image-based rendering uses a depth image and a texture image acquired by a depth camera and a multi-view camera.

The depth image is an image representing a distance between an object positioned in a three-dimensional space and a camera photographing the object in black and white units. The depth image is mainly used for a three-dimension reconstruction technology or a three-dimensional warping technology by using depth information and camera parameters. The depth image is also applied to a free-view TV and a three-dimensional TV. The free-view TV allows a user to not view the image only in one fixed view, but view the image in a predetermined view according to user's selection. The three-dimensional TV implements a real image by adding the depth image to an existing two-dimensional TV. The three-dimensional TV has been positively researched and developed in recent years.

In order to achieve smooth view switching in the free-view TV and the three-dimensional TV, a more improved intermediate image should be generated, such that it is important to accurately estimate the depth map. A stereo matching algorithm is used to estimate the depth map. However, many errors occur in the vicinity of a pixel having a discontinuous point of a depth value when the known stereo matching algorithm is used. These errors cause a problem that a boundary between objects is duplicated or obscured in generating the intermediate image. In the known stereo matching algorithm, since a searching operation is performed in adjacent images only in a horizontal direction in order to determine a disparity value, only an image acquired in a parallel camera configuration or under a rectification process may be used as an input. Accordingly, according to this method, there is a limit in estimating the depth map for the multi-view image having various camera configurations such as the parallel camera configuration and a circular camera configuration. Moreover, the known stereo matching algorithm is suitable for a stereo image since it searches for the disparity value according to a pixel unit, but the known stereo algorithm has may errors for the multi-view image having the amount of data larger than the stereo image in the case of searching for the disparity value according to the pixel unit, thereby increasing complexity.

SUMMARY OF THE INVENTION

Accordingly, it is an object of the invention to provide a device and a method for estimating a depth map, which is capable of acquiring a depth map that reduces errors and complexity, and is resistant to an external influence, and achieving smooth view switching and improved coding efficiency by generating an intermediate image with the depth map and utilizing the depth map for encoding a multi-view video, and a method for an intermediate image and a method for encoding a multi-view video using the same.

According to a preferred embodiment of the present invention, there is provided a device for estimating a depth map using multi-view images, which includes: a multi-view image storing unit that stores the multi-view images input through a multi-view video camera; a segment setting unit that sets a segment for pixels having a difference in the intensity between adjacent pixels is equal to or less than a threshold value in a target image where the depth map is to be estimated among the multi-view images stored in the multi-view image storing unit; a three-dimensional warping unit that acquires a warped image by performing three-dimensional warping for the segment set through the segment setting unit on the basis of a reference image adjacent to the target image; and an initial depth value searching unit that estimates only one depth value for each segment at the time of estimating the depth value of the warped target image on the basis of the reference image.

It is preferable that the initial depth value searching unit estimates the depth value for each segment by a self adaptation function which considers a function that depends on the difference in the intensity between the pixels of the segment and a function that depends on a gradient value for the pixels of the segment.

It is more preferable that a weighted value considering a difference between the mean intensity of the segment of the target image and the mean intensity of the segment of the reference image, which corresponds to the segment of the target image is applied to the self adaptation function.

Further, the self adaptation function is set by additionally considering a depth value searched in an image temporally earlier than the target image.

It is yet still preferable that the device for estimating the depth map using the multi-view images further includes a depth value refining unit that refines the depth value determined through the initial depth value searching unit by using the belief propagation method by the unit of the segment through set through the segment setting unit.

According to a second embodiment of the present invention, there is provided a method for estimating a depth map using multi-view images, which includes: (a) storing the multi-view images input through a multi-view video camera; (b) setting a segment for pixels having a difference in the intensity between adjacent pixels which is equal to or less than a threshold value in a target image where the depth map is to be estimated among the multi-view images stored through the step (a); (c) acquiring a warped image by performing three-dimensional warping for the segment set through the step (b) in a view of a reference image adjacent to the target image; and (d) estimating only one depth value for each segment at the time of estimating the depth value of the warped target image on the basis of the reference image.

It is preferable that in the step (d), the depth value for each segment is estimated by a self adaptation function considering a function depending on the difference in the intensity between the pixels of the segment and a function depending on a gradient value for the pixels of the segment.

It is more preferable that a weighted value considering a difference between the mean intensity of the segment of the target image and the mean intensity of the segment of the reference image is applied to the self adaptation function.

Further, the self adaptation function is set by additionally considering a depth value searched in an image temporally earlier than the target image.

It is yet still preferable that the method for estimating the depth map using the multi-view images further includes using the belief propagation method according to the unit of the segment by step (b) to refine the depth value determined through step (d).

According to a third embodiment of the present invention, there is provided a method for generating an intermediate image in which an intermediate-view image is generated by the depth map generated through the method for estimating the depth map.

According to a fourth embodiment of the present invention, a method for encoding images of different views by using an intermediate-view image in a multi-view video, comprising: (A) inputting a target image to be encoded in the multi-view video; (B) adding an intermediate image generated according to claim 12 to a reference image list; (C) determining a motion vector of the target image on the basis of a reference image of the reference image list; and (D) acquiring a difference between the target image and the reference image motion-compensated by the motion vector determined by step (C).

According to the present invention, it is possible to acquire a depth map that reduces an error of a depth value and complexity generated in the course of converting a variation map into a depth map by searching the depth value by using the three-dimensional warping after dividing an area of a target image by configuring a segment for similar pixels, and is resistant to external influence such as disharmony of a color between cameras by searching the depth value using the self adaptation function to which an extended gradient map is added.

It is possible to acquire a more accurate depth value of an occlusion area which may be problematic at the time of using only one of left and right images by applying the matching function to both the left image and the right image in the course of searching the depth value for one segment.

According to the present invention, it is possible to remove an error which may occur due to similarity in colors between pixels existing in the background by refining an initial depth map by using a segment-unit belief propagation method and acquiring a more accurate object boundary than a depth map acquired by a known depth map estimating method.

According to the present invention, it is possible to acquire an intermediate image of more improved image quality by improving the accuracy of the depth map, thereby enabling smoother view switching in a three-dimensional TV, a free-view TV, and the like According to the present invention, it is possible to improve encoding efficiency by providing a reference image having a spatial correlation degree higher than encoding a multi-view video through the more improved intermediate image.

BRIEF DESCRIPTION OF THE DRAWINGS

FIG. 5 is a conceptual diagram of a segment unit belief propagation method performed in a depth value refining unit according to the present invention;

DESCRIPTION OF EXEMPLARY EMBODIMENT

Figure 1:
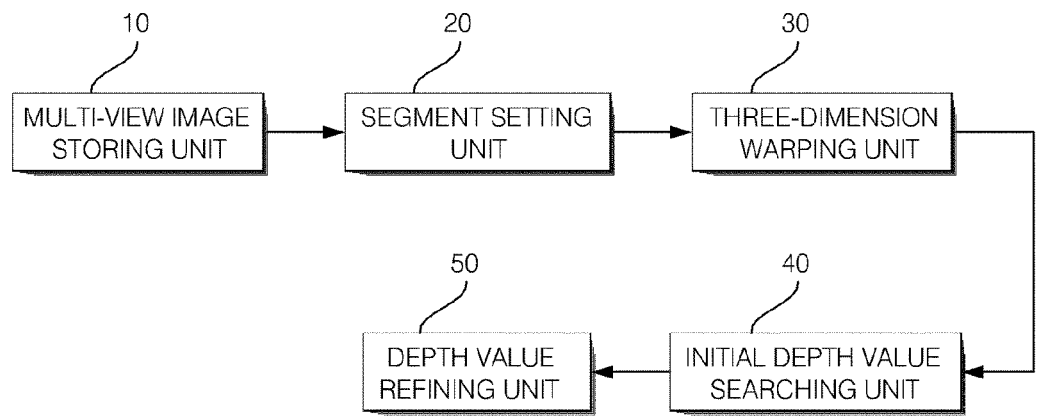
FIG. 1 is a block diagram of a device for estimating a depth map according to a preferred embodiment.

Hereinafter, the preferred embodiments of the invention will now be described in detail with reference to the accompanying drawings. First, it will be noted that like reference numerals refer to like elements even though the elements are shown in different drawings at the time of granting the reference numerals to the elements in the drawings. Further, in describing the present invention, if it is judged that the detailed description of known elements and functions is not relative, the detailed description will be omitted. Although the preferred embodiments of the present invention will be described, it should be understood that various modifications may occur by those skilled in the art, without departing from the scope and spirit of the present invention.

First, a device and a method for estimating a depth map according to a preferred embodiment of the present invention will be described.

In the following description, a 'target image' represents an image which is a target of which an estimated depth value. A 'reference image', as an image for performing stereo matching relating to the target image, represents an image positioned adjacent to or in the vicinity of the target image among images acquired through a multi-view camera. A 'warped target image' represents an image acquired by three-dimensionally warping the target image on the basis of the reference image.

Figure 6:
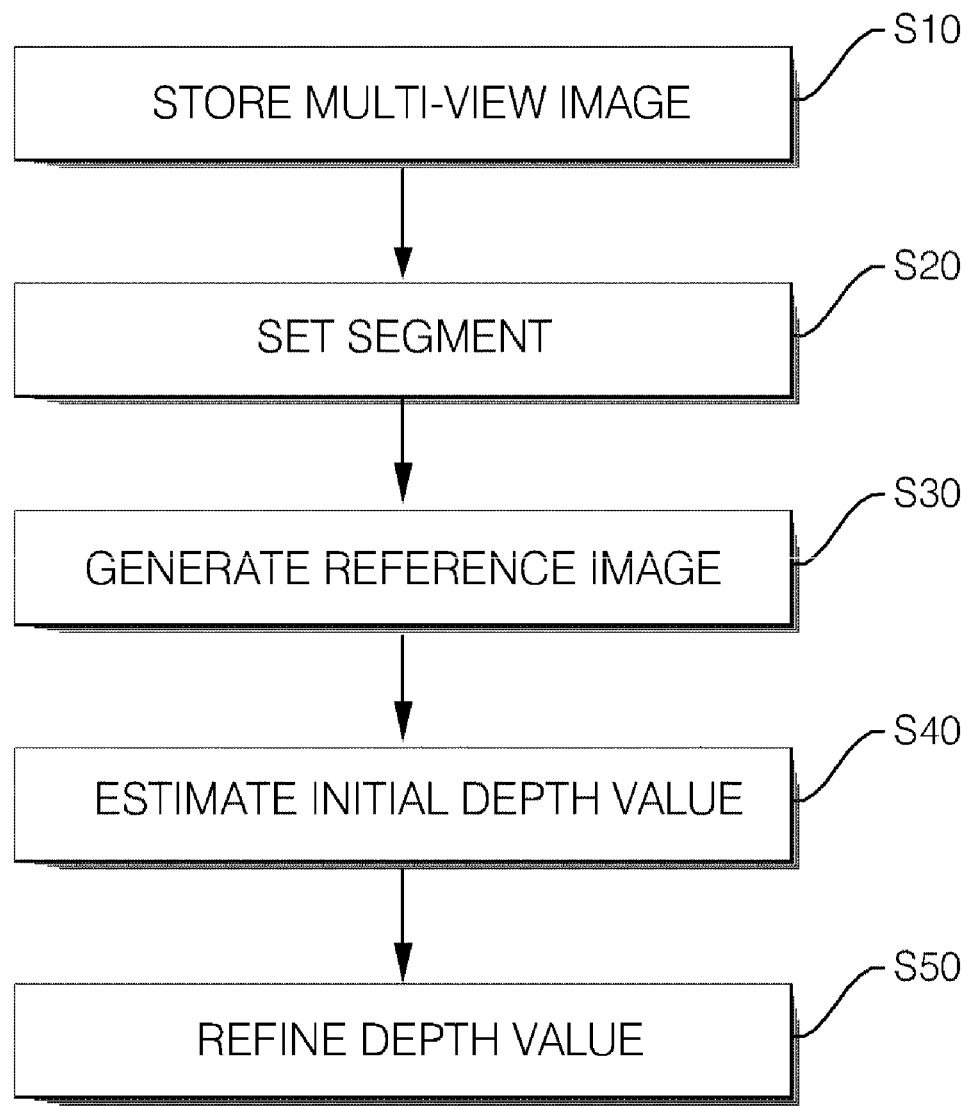
FIG. 6 is a flowchart of a method for estimating a depth map according to a preferred embodiment of the present invention.

FIG. 1 is a block diagram of a device for estimating a depth map according to a preferred embodiment of the present invention. FIG. 6 is a flowchart of a method for estimating a depth map according to a preferred embodiment of the present invention.

Referring to FIG. 1, a device for estimating a depth map according to a preferred embodiment of the present invention includes a multi-view image storing unit 10, a segment setting unit 20, a three-dimensional warping unit 30, an initial depth value searching unit 40, and a depth value refining unit 50.

Referring to FIG. 6, a method for estimating a depth map according to a preferred embodiment of the present invention includes storing the multi-view images input through a multi-view video camera (S10); setting a segment for pixels having a difference in the luminance between adjacent pixels is equal to or less than a threshold value in a target image where the depth map is to be estimated among the multi-view images stored at Step S10 (S20); acquiring a warped image by performing three-dimensional warping for the segment set through at Step S20 on the basis of a reference image adjacent to the target image (S30); estimating only one depth value for each segment at the time of estimating the depth value of the warped target image on the basis of the reference image (S40); and refining the depth value determined at Step S40 by adopting the belief propagation method according to the unit of the segment set at Step S20 (S50). In the description of the device for estimating the depth map according to the preferred embodiment of the present invention, the method for estimating the depth map will be sufficiently described. Therefore, hereinafter, the device for estimating the depth map will be mainly described.

The multi-view image storing unit 10 serves to store a multi-view image input through a multi-view video camera.

The multi-view image storing unit 10 stores at least as many images video cameras constituting the multi-view video camera in a view direction and stores continuous images in a temporal direction for each view.

The segment setting unit 20 serves to set a segment composed of pixels having a difference in the luminance or chrominance between adjacent pixels is equal to or less than a threshold value in a target image of which a depth map will be estimated among the multi-view images stored in the multi-view image storing unit 10. That is, the segment setting unit 20 partitions an image into segments by binding up pixels having similar luminance and color information.

Figure 2:
FIG. 2 is a diagram illustrating an example of an image in which similar pixels are divided by the segment unit by a segment setting unit.

At this time, it is assumed that a depth value minutely varies in the partitioned segments and a discontinuous point of the depth value occurs on the boundary of the segments. In order to satisfy such an assumption, it is preferable that the segments are subdivided to have the smallest size as possible and thus it is preferable that the threshold is set to a small value. If the threshold value becomes larger, the range of the similar luminance becomes wider. Therefore, the size of the segment increases, such that there is a possibility that the discontinuous point of the depth value will belong to the segment increases. For example, the threshold value may be set to 0. FIG. 2 is a diagram illustrating an example of an image divided into segments by binding together similar pixels by the segment setting unit.

Figure 3:
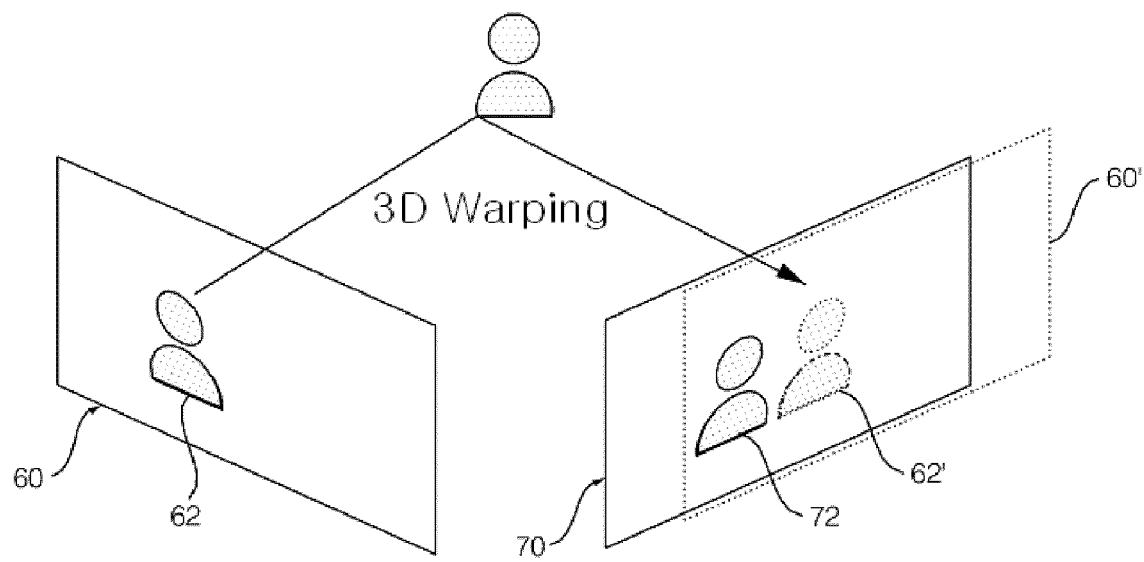
FIG. 3 is a diagram illustrating that a warped target image is acquired by three-dimensional warping.

The three-dimensional warping unit 30 serves to acquire a warped target image by performing three-dimensional warping for the segments set by the segment setting unit 20 on the basis of a reference image adjacent to the target image FIG. 3 is a diagram illustrating that the warped target image is acquired by using the three-dimensional warping.

In a known stereo matching algorithm, since a searching operation is performed in adjacent images only in a horizontal direction in order to determine a disparity, only an image acquired in a parallel camera configuration or under a rectification process can be used as an input. Accordingly, in the known stereo matching algorithm, there is a limit in estimating a depth map for a multi-view image having various camera configurations such as a circular camera configuration, etc.

Referring to FIG. 3, in order to solve the above-described problem, the three-dimensional warping unit 30 generates a warped segment 62' in a warped target image 60' projected to a reference image 70 through the three-dimensional warping for a specific segment 62 among target images 60 based on determining the depth map. Thereafter, stereo matching for estimating the depth map is performed for the warped segment 62 in the warped target image 60' and a reference segment 72 corresponding to the specific segment 62 in the reference image 70. As a result, the three-dimensional warping unit 30 can estimate the depth map independently from an arrangement structure of cameras constituting a multi-view camera. Meanwhile, in FIG. 3, 'd' represents the disparity between the warped segment 62 and the reference segment 72.

The initial depth value searching unit 40 estimates a depth value of the warped target image 60' on the basis of the reference image 70 and serves to search one depth value for each segment. Since the multi-view image is relatively larger and has an amount of data larger than a stereo matching test image, the multi-view image has many errors in the case of searching for a disparity value using a pixel unit like the known stereo matching algorithm, thereby increasing the complexity. Accordingly, the initial value searching unit 40 searches for the depth value by a segment unit instead of the pixel unit.

Meanwhile, a matching function is required for the stereo matching. An SD (Squared Intensity Difference) function and an AD (Absolute Intensity Difference) function are generally used as the matching function. However, these general matching functions are sensitive to disharmony of color between target images of the stereo matching. In particular, in case of the multi-view camera, there is a larger possibility that the disharmony of the color will occur by the difference in the illumination for each view, and the characteristics of the cameras constituting the multi-view camera, etc.

Accordingly, the initial depth value searching unit 40 according to the preferred embodiment of the present invention searches an initial depth value by using a self adaptation function acquired by adding a function using a gradient map to the AD function. The self adaptation function is given by the following Equation 1.

$$C(x,y,d)=(1-\omega) \times C_{MAD}(x,y,d) + \omega \times C_{MGRAD}(x,t,d) \quad \text{Equation 1}$$

Herein, $\omega$ is a weighted value that is larger than 0 and smaller than 1, x and y are positions of a pixel in the segment of the target image, d is displacement, $C_{MAD}$ is a mean absolute difference of luminance of a segment for each measurement displacement, $C_{MGRAD}$ is a mean absolute difference of a gradient of the segment for each measurement displacement.

Further, $C_{MAD}$, as a known AD function, is given by the following Equation 2.

$$C_{MAD}(x, y, d) = \frac{1}{M} \sum_{(x,y) \in S_k} |I_1(x, y) - I_2(x', y')| \quad \text{Equation 2}$$

$C_{MGRAD}$, as a function for a gradient map considering four directions, is given by the following Equation 3.

$$C_{MGRAD}(x, y, d) = \quad \text{Equation 3}$$
$$\frac{1}{M} \sum_{(x,y) \in S_k} \{|\nabla_x I_1(x, y) - \nabla_x I_2(x', y')| + |\nabla_y I_1(x, y) - \nabla_y I_2(x', y')| + |\nabla_{-x} I_1(x, y) - \nabla_{-x} I_2(x', y')| + |\nabla_{-y} I_1(x, y) - \nabla_{-y} I_2(x', y')|\}$$

In the above-described equations, M is the number of pixels in the segment, $S_k$ is a corresponding segment, $I_1(x,y)$ is an intensity value of a pixel located at a position (x,y) in the target image, $I_2(x',y')$ is an intensity value of a pixel located at a position (x',y') in the reference image, and $\nabla_x$, $\nabla_y$, $\nabla_{-x}$, and $\nabla_{-y}$ are gradient maps of +x, +y, −x, and −y directions, respectively.

The self adaptation function according to the preferred embodiment of the present invention increases the tolerance of the gradient map by using the gradient maps in four directions such as the +x, +y, −x, and −y directions in order to prevent an influence from an external factor such as disharmony of the color between the cameras.

Meanwhile, the self adaptation function may be expressed as shown in the following Equation 4. In the self adaptation function according to Equations 1 and 4, the function using the gradient map is used for the general matching function in searching the depth value of the segment of the target image for the reference image segment.

$$C(x,y,d)=C_{MAD}(x,y,d)+\omega SC_{MGRAD}(x,y,d) \quad \text{Equation 4}$$

The weighted value $\omega$ in Equation 1 or 4 may be determined by a mean absolute difference of the luminance by comparing two views. At this time, $\omega$ may be determined by Equation 5.

$$\omega = |DC_C - DC_{ref}| \quad \text{Equation 5}$$

$DC_C$ is a mean luminance value of the specific segment of the target image and $DC_{ref}$ is a mean luminance value of the segment in the reference image. By setting the matching function as described above, the MGRAD function $C_{MGRAD}$ using the gradient map is added to the known MAD function $C_{MAD}$, while it is possible to automatically set a weighted value for determining the weight of the $C_{MGRAD}$.

Meanwhile, in the known methods of estimating the depth map, since the depth map is searched independently from each frame of the image, temporal consistency of the depth map deteriorates and even though a refinement process is performed, an error in depth value still occurs.

In the preferred embodiment of the present invention, in order to improve a temporal correlation degree of the depth map and the reliability of the depth value in the course of searching an initial depth map, a weighted function $C_{temp}(x,y,d)$ considering a depth value searched in a previous frame is added to the self adaptation function. Accordingly, a modified self adaptation function is expressed as shown in Equation 6.

$$C(x,y,d)=(1-\omega)SC_{MAD}(x,y,d)+\omega SC_{MGRAD}(x,t,d)+C_{temp}(x,y,d) \quad \text{Equation 6}$$

In Equation 6, the weighted function $C_{temp}(x,y,d)$ may be expressed as shown in the following Equation 7.

$$C_{temp}(x,y,d)=\lambda |d-D_{prev}(x,y)| \quad \text{Equation 7}$$

In Equation 7, $\lambda$ is a slope for the weighted function and $D_{prev}(x,y)$ is a depth value of the target image in a previous frame. In the modified self adaptation function, it is possible to achieve the temporal consistency of the depth value by considering the depth value in the temporally previous frame in estimating a depth value for a current target image.

Meanwhile, the initial depth value searching unit 40 may use both a left image and a right image of the target image as an adjacent reference image. That is, the initial depth value searching unit 40 can acquire a more accurate depth value by applying the matching function to both the left image and the right image in the course of searching the depth value for one segment. In case of searching the depth value by using only one image like the known stereo matching algorithm, an occlusion area where a specific part is occluded may be generated. However, the initial depth value searching unit 40 can search the accurate depth value by preventing the occlusion area from being generated with the right image instead of the left image in a case that an object existing in the target image is occluded by another object in the left image.

The depth value refining unit 50 serves to acquire a final depth value by refining the initial depth value calculated by the initial depth value searching unit 40 to reduce an error. The initial depth value acquired by the initial depth value searching unit 40 may still have errors in some cases. For example, in case of searching the depth value for a background in the image, disharmony of color between pixels existing in the background is not generally large. Therefore, since a minor error may be generated even though a wrong depth value is searched, the wrong depth value may be recognized as an accurate depth value. As a method for solving the above-described problem, refinement methods such as graph cut and dynamic programming are used, but these methods are a little inferior not as accurate in performance. The depth value refining unit 50 reduces the error (particularly, the error in the background) of the initial depth map by using a segment unit belief propagation method.

Figure 4A:
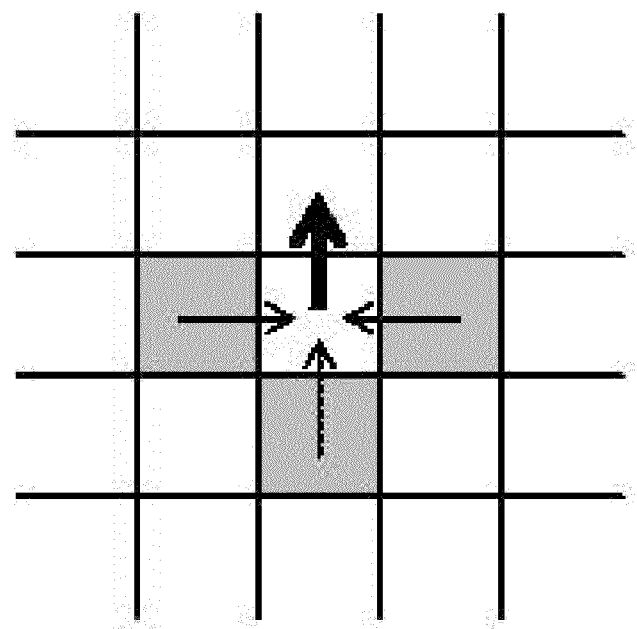
FIG. 4 is a conceptual diagram of a known pixel unit belief propagation method.

FIG. 4a is a conceptual diagram illustrating a pixel unit belief propagation method. Recently, it has been judged that the pixel unit belief propagation method has superior performance to other refinement methods. The pixel unit belief propagation method sends messages to upper, lower, left, and right adjacent pixels to allow the pixels to consider the depth values of the adjacent pixels (see "Efficient Belief Propagation for Early Vision", International Journal of Computer Vision, Vol. 70, No. 1 written by P. F. Felzenszwalb and D. P. Huttenlocher in October 2006). That is, a message (dotted arrow line) from the adjacent pixel to a current pixel is used at the time of sending the message to the adjacent pixel from the current pixel. The pixel unit belief propagation method repetitively updates the message by introducing an energy function considering data cost which is the cost for assigning a label to a specific pixel and discontinuity cost which is the cost for assigning labels to two adjacent pixels, and using a grid graph.

Figure 4B:
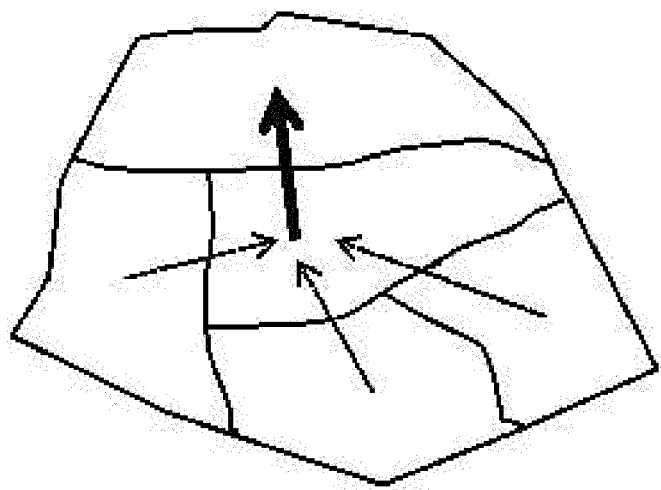

FIG. 4b is a conceptual diagram illustrating a segment unit belief propagation method.

The segment unit belief propagation method performed by the depth value refining unit 50 is based on the above-described pixel unit belief propagation method, but shows a difference in that a unit for sending a message is the segment instead of the pixel. The depth value refining unit 50 uses messages sent to a current segment from an adjacent segment (dotted arrow line) at the time of sending the messages to the adjacent segment from the current segment (thick arrow line). That is, since the initial depth value is estimated by the segment unit through the initial depth value searching unit 40, the segment unit belief propagation method is used to refine the initial depth value. The depth value refining unit 50 refines the initial depth value by applying the segment unit belief propagation method to reduce the error.

Figure 5A:
FIGS. 5a and 5b are diagrams illustrating examples of an initial depth map and a final depth map, respectively.
Figure 5B:
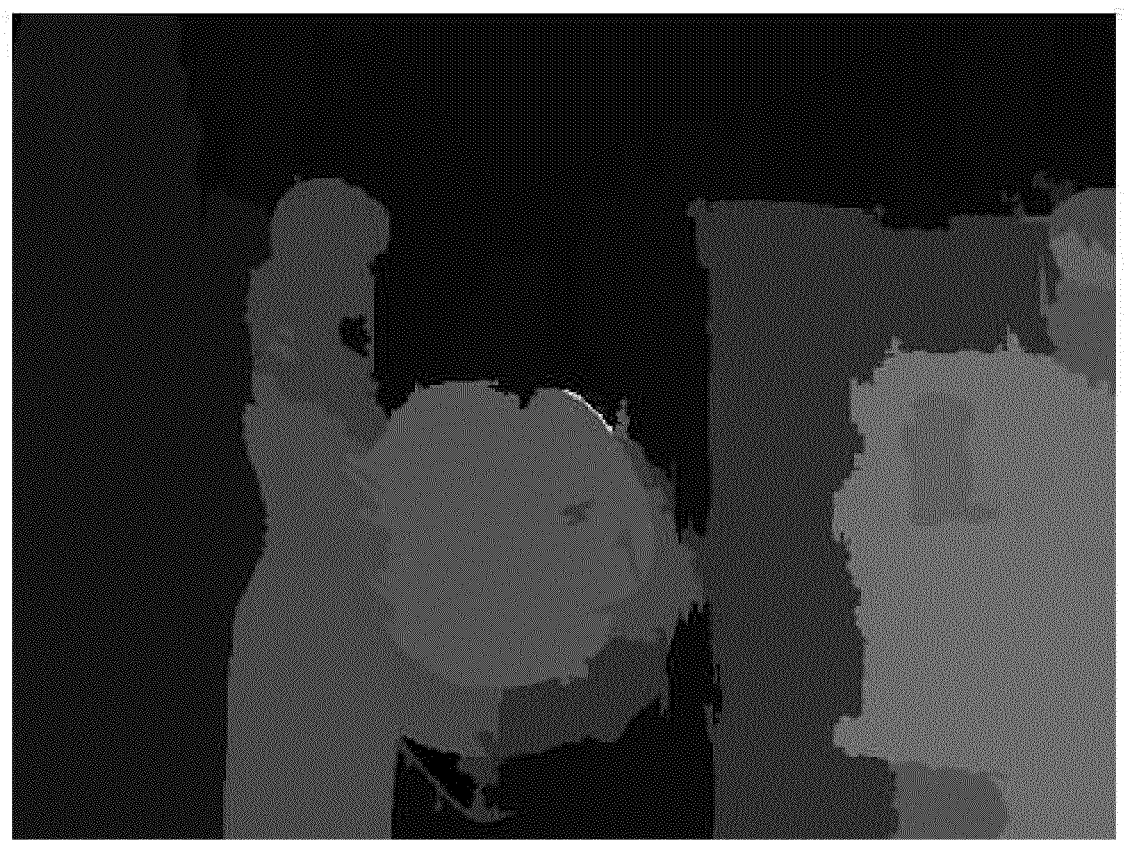

FIG. 5a illustrates an example of the initial depth map and FIG. 5b illustrates an example of a final depth map. Referring to FIGS. 5a and 5b, it is found that the boundary between the objects is comparatively clearer in both the initial and final depth maps than the depth map acquired by the known depth map estimating method, and it is found that the error (particularly, in the background) is remarkably reduced through the refinement process in the final depth map in comparison with the initial depth map.

Next, a method for generating an intermediate image according to a preferred embodiment of the present invention will be described.

The method for generating the intermediate image according to the preferred embodiment of the present invention generates an image in an intermediate view by a depth image-based rendering (DIBR) method. The DIBR method renders an image in a predetermined view by using a depth image composed of a texture image and distance information corresponding to each pixel of the texture image. After scene-modeling a color and a depth image in a three-dimensional mesh by using an orthogonal coordinate, the DIBR method renders the image in the predetermined view by using a virtual camera. At this time, the used depth image may be directly acquired by using the depth camera, but it is preferable that the used depth image is acquired by using the depth image generated by the above-described method. Herein, the method for generating the intermediate image is particularly not limitative. Therefore, it is possible to acquire the intermediate image having further improved image quality by generating the intermediate image using the general DIBR method through the multi-view image acquired from the multi-view video camera and the depth map acquired by the above-described method.

Various preprocessing methods had been proposed in order to generate the multi-view image from the depth image and the texture image. For example, Mr. Zhang reduces geometrical noise generated due to a disocclusion area and a symmetric Gaussian filter, and improves the image of the intermediate image by removing the disocclusion area by sequentially three-dimensional warping and hole filling after applying an asymmetric Gaussian filter to the entire depth image (see "Stereoscopic Image Generation Based on Depth Images for 3D TV, IEEE Trans. on Broadcasting, vol. 51, pp. 191-199, written by L. Zhang and W. J. Tam in 2005).

In addition to the DIBR method, a hierarchical natural-textured mesh stream (HNTMS) method using a three-dimensional mesh structure had been proposed (see "Method of Representing Three-dimensional Real Video using Depth Camera System", Korea Multimedia Society's Journal, 10-1, pp. 41-51, written by Seong-yeol Kim and Yo-seong Ho in 2006). According to this method, a three-dimensional real video is sequentially rendered by using the depth image and the texture image as an input. In the method for generating the intermediate image according to the preferred embodiment of the present invention, these methods may be selectively adopted.

Next, an encoding method according to a preferred embodiment of the present invention will be described.

Figure 7:
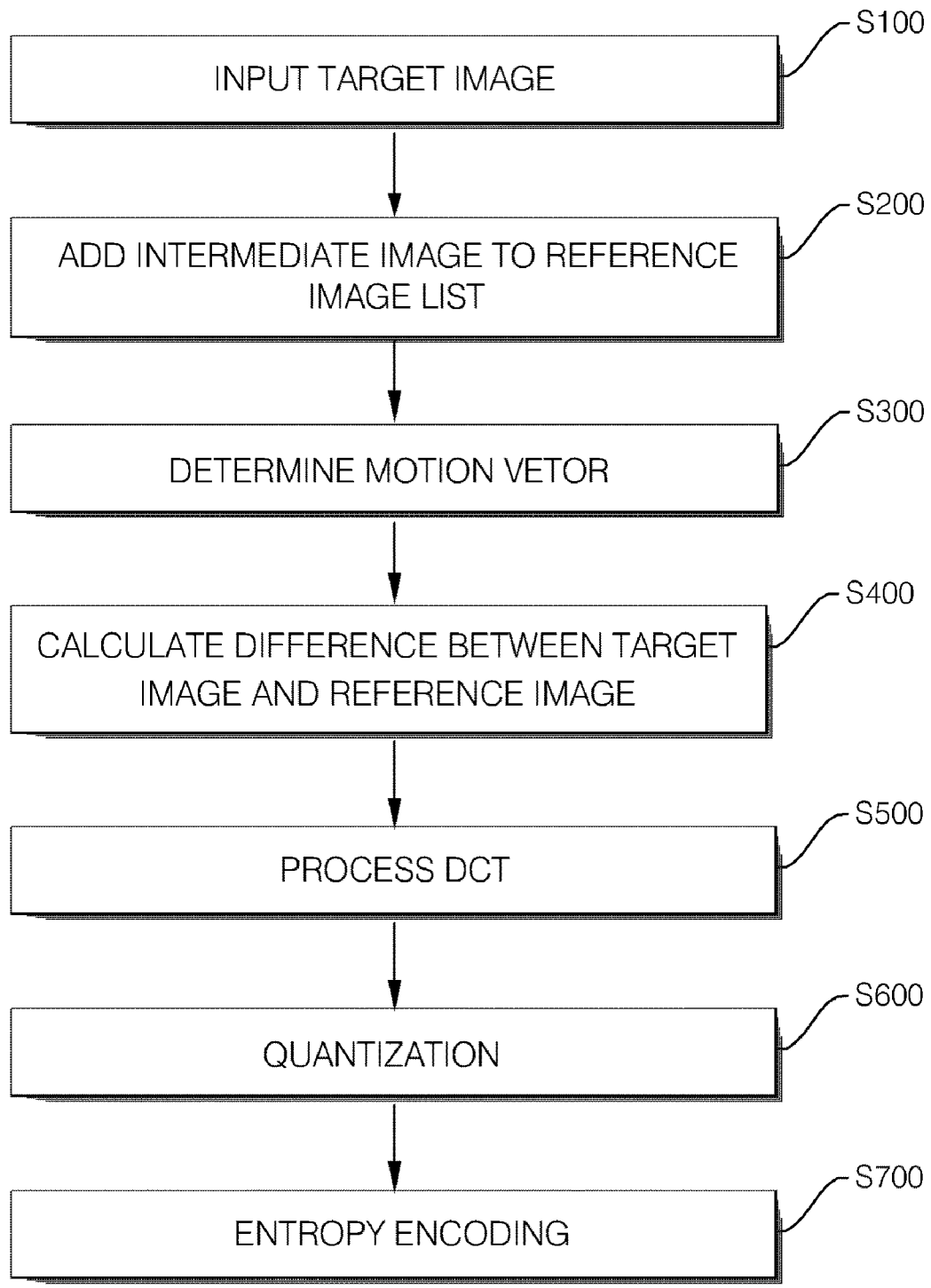
FIG. 7 is a flowchart of an encoding method according to a preferred embodiment of the present invention.

FIG. 7 is a flowchart of an encoding method according to a preferred embodiment of the present invention.

Referring to FIG. 6, the encoding method according to the preferred embodiment of the present invention includes inputting a target image (S100); adding an intermediate image to a reference image list (S200); determining a motion vector (S300); calculating a difference between the target image and the reference image (S400); processing DCT (S500); performing quantization (S600); and performing entropy encoding (S700).

In Step S100, the target image to be encoded of the multi-view video is input. A video feed received from a plurality of video camera through a transmission line is temporarily stored after being captured by a capture buffer.

In Step S200, the intermediate image is generated and is added to the reference image list. At this time, it is preferable that the intermediate image is generated by an intermediate image synthesizing method. This is why the encoding efficiency of the multi-view video becomes even more superior if there is a reference image similar to the target image to be encoded while the reference image has further improved image quality.

The purpose of using the intermediate image in encoding the multi-view video will be described below. For example, in the case when screens of left and right views are already encoded at the time of encoding a screen B, an image of an intermediate image may be generated by referring to the images. Since the generated intermediate image is the same as the target image to be encoded in view, the intermediate image has a very high correlation degree. Accordingly, when the intermediate image is used as the reference for an encoding process, the encoding efficiency may be improved by the high correlation degree with the target image.

In Step S300, the motion vector of the target image is determined based on the reference image of the reference image list. At this time, the target image is the image input in Step S100 and the reference image is the image stored in the reference image list including the intermediate image generated from the depth map. By using the reference image, the motion of the target image is expected and the motion vector for a corresponding block of the target image is determined.

In Step S400, a difference is determined between the target image and the reference image motion-compensated by the motion vector determined at Step S300. In Step S400, the motion compensation for the reference image is performed by using the motion vector, whereby an expectation image is configured and the matrix of the difference between the target image and the expectation image is determined.

In Step S500, a DCT (Discrete Cosine Transformation) coefficient is acquired by discrete cosine transforming the difference matrix.

In Step S600, the DCT coefficient acquired at Step S500 is quantized.

In Step S700, the DCT coefficient quantized at Step S600 is entropy encoded by a method such as CAVLC (Context Adaptive Variable Length Coding) or CABAC (Context Adaptive Binary Arithmetic Coding). An entropy coded feed is transmitted to the outside through a buffer, and the like.

The present invention may be widely used in a three-dimensional TV, a free-view TV, a monitoring camera image, and the like determining an initial depth value by a segment unit, determining a final depth map by refining the initial depth value by the segment unit by applying a belief propagation method to acquire an intermediate image having improved image quality.

As described above, although the preferred embodiments of the present invention have been disclosed for illustrative purposes, those skilled in the art will appreciate that various modifications, additions, and substitutions are possible, without departing from the scope and spirit of the invention as disclosed in the accompanying claims. Accordingly, the embodiments and the accompanying drawings in the present invention are used not for defining the scope and spirit of the invention but for describing the scope and spirit of the invention. The scope and spirit of the invention is not limited by these embodiments and accompanying drawings. The protection scope of the invention should be understood by the accompanying claims, and it should be understood that all scopes and spirits without departing the accompanying claims are included in the scope of right of the invention.

What is claimed is:

1. A device for estimating a depth map using multi-view images, comprising:
a multi-view image storing unit that stores the multi-view images input through a multi-view video camera;
a segment setting unit that sets a segment for pixels having a difference in the intensity between adjacent pixels is equal to or less than a threshold value in a target image where the depth map is to be estimated among the multi-view images stored in the multi-view image storing unit;
a three-dimensional warping unit that acquires a warped image by performing three-dimensional warping for the segment set through the segment setting unit in a view of a reference image adjacent to the target image; and
an initial depth value searching unit that estimates only one depth value for each segment at the time of estimating the depth value of the warped target image on the basis of the reference image;
wherein the initial depth value searching unit estimates the depth value for each segment by a self adaptation function that considers a function depending on the difference in the intensity between the pixels of the segment and a function depending on a gradient value for the pixels of the segment.

2. The device of claim 1,
wherein a weighted value considering a difference between the mean intensity of the segment of the target image and the mean intensity of the segment of the reference image corresponding to the segment of the target image is applied to the self adaptation function.

3. The device of claim 2,
wherein the self adaptation function is set by additionally considering a depth value searched in an image temporally earlier than the target image.

4. The device of claim 1,
wherein the self adaptation function is set by additionally considering a depth value searched in an image temporally earlier than the target image.

5. The device of claim 1, further comprising:
a depth value refining unit that refines the depth value determined through the initial depth value searching unit by using the belief propagation method by the unit of the segment through set through the segment setting unit.

6. A method for estimating a depth map using multi-view images, comprising:
(a) storing the multi-view images input through a multi-view video camera performed by a multi-view image storing unit;
(b) setting a segment for pixels having a difference in the intensity between adjacent pixels is equal to or less than a threshold value in a target image where the depth map is to be estimated among the multi-view images stored through the step (a) performed by a segment setting unit;
(c) acquiring a warped image by performing three-dimensional warping for the segment set at step (b) on the basis of a reference image adjacent to the target image performed by a three-dimensional unit; and
(d) estimating only one depth value for each segment at the time of estimating the depth value of the warped target image on the basis of the reference image performed by an initial depth value searching unit,
wherein in step (d), the depth value for each segment is estimated by a self adaptation function that considers a function depending on the difference in the intensity between the pixels of the segment and a function depending on a gradient value for the pixels of the segment.

7. The method of claim 6,
wherein a weighted value considering a difference between the mean intensity of the segment of the target image and the mean intensity of the segment of the reference image is applied to the self adaptation function.

8. The method of claim 7,
wherein the self adaptation function is set by additionally considering a depth value searched in an image temporally earlier than the target image.

9. A method for encoding images of different views by using an intermediate-view image in a multi-view video, comprising:
(A) inputting a target image to be encoded in the multi-view video using a device for estimating a depth map;
(B) adding an intermediate image generated according to claim 8 to a reference image list using a device for estimating a depth map;
(C) determining a motion vector of the target image on the basis of a reference image of the reference image list using a device for estimating a depth map; and
(D) acquiring a difference between the target image and the reference image motion-compensated by the motion vector determined at step (C) using a device for estimating a depth map.

10. The method of claim 6,
wherein the self adaptation function is set by additionally considering a depth value searched in an image temporally earlier than the target image.

11. The method of claim 6, further comprising:
using the belief propagation method by the unit of the segment set through the step (b) to refine the depth value determined through the step (d).

12. A method for generating an intermediate image,
wherein after a depth map is estimated according to claim 6, an intermediate-view image is generated by the depth map.

* * * * *